United States Patent

[11] 3,628,372

| [72] | Inventor | Thomas S. Honda |
| | | Scotia, N.Y. |
| [21] | Appl. No. | 42,292 |
| [22] | Filed | June 1, 1970 |
| [45] | Patented | Dec. 21, 1971 |
| [73] | Assignee | General Electric Company |

[54] FLUIDIC ANGULAR POSITION SENSOR
10 Claims, 3 Drawing Figs.

[52] U.S. Cl. .................................................. 73/37
[51] Int. Cl. ............................................. G01b 13/00
[50] Field of Search ........................................ 73/37,
37.5–37.9; 33/DIG. 2; 137/81.5

[56] References Cited
UNITED STATES PATENTS

| 2,663,977 | 12/1953 | Gerard et al. .............. | 73/37.9 UX |
| 3,416,358 | 12/1968 | Davis et al. ................ | 73/37 |
| 3,430,499 | 3/1969 | Craig ......................... | 137/81.5 UX |
| 3,433,238 | 3/1969 | Nightingale ................ | 137/81.5 |
| 3,517,545 | 6/1970 | Ogren ........................ | 73/37.5 |
| 3,541,839 | 11/1970 | Weber et al. ............... | 73/37 |

*Primary Examiner*—S. Clement Swisher
*Assistant Examiner*—William A. Henry, II
*Attorneys*—Frank L. Neuhauser, Oscar B. Waddell and Joseph B. Forman ABSTRACT: The relative angle of a rotary shaft is sensed by a fluidic bridge circuit consisting of a pair of fixed restrictors and a pair of variable restrictors. The variable restrictors are formed by an axial groove in the rotary shaft and a vented, constant pitch, helical groove in a sleeve member surrounding the shaft. The vented point of overlap of the helical groove with respect to the shaft axial groove divides the axial groove into the two variable restrictors. Pressurized fluid is supplied to the juncture of the fixed restrictors, and the fluid pressure at the juncture of each fixed and variable restrictor varies linearly with change in shaft angular position.

Inventor:
Thomas S. Honda,
by Louis A. Moucha

3,628,372

FLUIDIC ANGULAR POSITION SENSOR

My invention relates to a fluidic sensor device, and in particular, to a device for generating fluid pressure signals varying linearly with the angular position of a rotary shaft.

This application is related to a concurrently filed patent application Ser. No. 42,224, filed June 1, 1970 (RD–1953), entitled "Fluidic Function Generator" having the same inventor and assigned to the same assignee as the present invention.

In various control systems such as position control servos, the angular position of a rotary member must be known for purposes such as position feedback. In fluidic control systems, conventional flapper nozzle and jet pipe type fluidic position transducers are used for sensing angular position, but have the disadvantage of requiring large position gain reduction and a generally limited linear angle of operation. Thus, the prior art angular position sensor devices are not satisfactory in the high accuracy control systems being developed at the present time and for future applications.

Therefore, one of the principal objects of my invention is to provide a fluidic angular position sensor having linear operation over its entire range of operation.

Another object of my invention is to provide the sensor with an improved accuracy due to a larger range of motion of elements of the device.

Another object of my invention is to provide the sensor device for operation over 360° of angular rotation without the use of any motion reduction mechanism.

Briefly stated, my fluidic angular position sensor device includes a rotary shaft and a sleeve member supported in a housing. The rotary shaft is provided with an axial groove and is rotatable relative to the sleeve member. The sleeve member surrounds a portion of the shaft including the major portion of the axial groove in fluidtight relationship and is provided with a vented helical groove of constant pitch in overlapping fluid communication with the axial groove. The relative angle of the rotary shaft is sensed by a fluidic bridge circuit consisting of a pair of fixed restrictors and a pair of variable restrictors. The vented point of overlap of the helical groove with the shaft axial groove divides the axial groove into the two variable restrictors. Pressurized fluid is supplied to a juncture of the fixed restrictors, and the differential pressure at the two junctures of the fixed and variable restrictors varies linearly with change in shaft angular position.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawing wherein like parts in each of the several figures are identified by the same reference character, and wherein:

Figure 1:
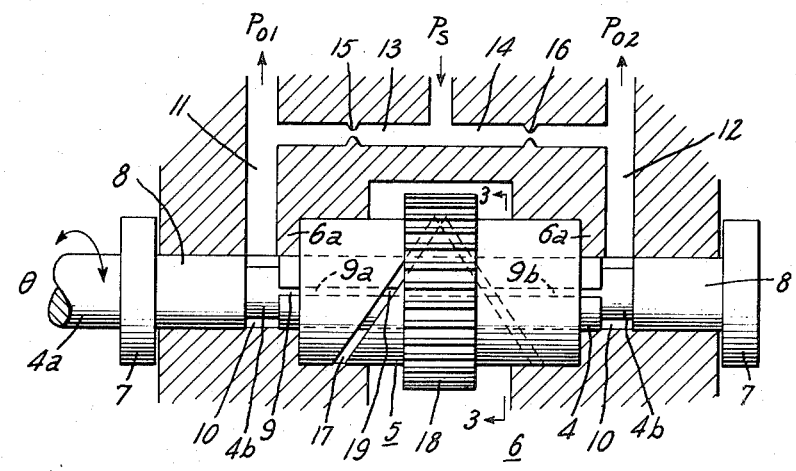
FIG. 1 is a diagrammatic view of a fluidic angular position sensor constructed in accordance with my invention wherein the helical groove is formed completely through the sleeve member.
Figure 3:
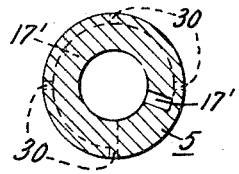
FIG. 3 is a sectional view that would be taken along line 3—3 in FIG. 1 illustrating a second embodiment of the vented helical groove wherein the groove is formed only on the inside surface of the sleeve member.

Referring now in particular to FIG. 1, there is shown a cylindrical rotary shaft 4 and a circular sleeve member 5 both supported in a housing shown by the cross hatching and identified as a whole by numeral 6. Shaft 4 is rotatable relative to sleeve member 5 but is in fluid tight relationship therewith, the fluidtightness being obtained by any conventional means such as capillary clearance. The driven portion 4a of rotary shaft 4 extends outward of the housing, shown extending to the left of the housing, and the shaft is mounted in conventional thrust and journal bearings 7 and 8 for support within the housing. An axial groove 9 having constant narrow width and depth dimensions is formed into the outer surface of shaft 4 along the entire length of the central portion thereof. Shaft 4 has reduced diameter portions 4b intermediate bearings 8 and the shaft central portion to form two annular-shaped chambers 10 in the volumes not occupied by the reduced diameter portions 4b of the shaft. A pair of first fluid flow passages 11 and 12 have first ends thereof in fluid communication with chambers 10 and second ends thereof comprise the outputs of the angular position sensor device across which is developed a differential pressure $P_{o1}-P_{o2}$. A pair of second fluid flow passages 13 and 14 have first ends thereof in fluid communication with passages 11 and 12 and second ends thereof in fluid communication with a source of pressurized fluid $P_s$ at a juncture of passages 13 and 14. In general, the fluid at source $P_s$ is maintained at a relatively constant pressure. The fluid utilized in my device may be a gas such as pressurized air, or a liquid such as pressurized oil, that is, my device can be pneumatic or hydraulic. Passages 13 and 14 are provided with fixed fluid flow restrictors 15 and 16, respectively. In general, restrictors 15 and 16 have equal flow restrictive values. Sleeve member 5 is concentric with shaft 4 and surrounds the central portion thereof. The ends of sleeve member 5 are in close proximity to the ends of the central portion of shaft 4, being spaced therefrom by the housing members 6a which support the ends of the sleeve member within the housing. Sleeve member 5 is provided with a vented helical groove 17 of constant pitch which is adapted to be in overlapping fluid communication with the axial groove 9 on rotary shaft 4. Helical groove 17 may be vented to the atmosphere surrounding the housing by being formed completely through the side of sleeve member 5 as depicted in FIG. 1, or alternatively, may be formed into the inner surface of the sleeve member as depicted in the sectional view in FIG. 3. Groove 17 extends 360° of angular rotation around sleeve member 5, that is, forms one complete revolution, although it could extend less than 360° is desired.

As stated hereinabove, axial groove 9 has a width and depth of narrow dimensions such that it presents a relatively high restriction to fluid flow therethrough. Helical groove 17 is of significantly larger depth and, or width dimensions such that it presents a negligible restriction to the fluid being vented therethrough. Thus, it can be appreciated that my fluidic angular position sensor device forms a fluidic bridge circuit including a pair of fixed restrictors 15 and 16 and a pair of variable restrictors formed by the axial groove 9 divided into two variable length parts defined between the ends thereof and the vented point of overlap with the helical groove. Thus, in the particular angular position $\theta$ of shaft 4 in FIG. 1, a first of the two variable restrictors 9a is defined by the length of the axial groove between the left end thereof and the point of overlap 19 with the vented helical groove, and the second variable restrictor 9b is the length of axial groove 9 defined between overlap point 19 and the right end of axial groove. The fluidic bridge circuit is thus completely described as including a pair of fixed restrictors 15, 16, a pair of variable restrictors 9a, 9b, a source of pressurized fluid supplied to the juncture of fixed restrictors 15 and 16, and a vent at the juncture 19 of the variable restrictors 9a and 9b.

It is evident that the point of overlap 19 (i.e. the juncture of variable restrictors 9a and 9b) varies (shifts longitudinally) along the axial groove 9 with rotation of shaft 4, and in particular, varies linearly with changes in angular position or angular displacement from a particular shaft 4 reference angular position, that is, the point of overlap 19 shifts axially in equal increments for equal increments in angular displacement of shaft 4. The reference (or zero) position may be chosen at any particular angular orientation of shaft 4, but would commonly be at the orientation wherein axial groove 9 is overlapped by either of the end points of helical groove 17 or the center (the 180° point) thereof, it being understood that in this first application sleeve member 5 is maintained in a fixed position and only shaft 4 is movable relative thereto. In the case of the reference (zero) angular position of shaft 4 corresponding to either of the ends of helical groove 17, my fluidic angular position sensor is then adapted for sensing an angular displacement up to 360° from such (zero) reference angle. In the case of the (zero) reference angle corresponding to the 180° point of the helical groove 17, my device is adapted for sensing angular displacements up to a maximum of ±180°. It is apparent that the differential pressure $P_{01}-P_{02}$ developed across the output ends of passages 11 and 12 is directly proportional to the angular displacement of the rotary shaft 4 from its reference position since the angular displacement determines the point of overlap 19 and thus the respective values of variable restrictors 9a and 9b. It should be noted that the output differential pressure $P_{01}-P_{02}$ changes polarity as the vented overlap point 19 passes the midpoint of the axial groove 9. This differential output pressure varies linearly with changes in the angular displacement of the shaft and it can be appreciated that the accuracy of my device is considerably greater than that of conventional devices which have limited linear range of operation. My device is linear over its total range of operation, i.e., over the total length of helical groove 17, and it should be evident that the accuracy is improved by increasing the length of both the axial groove 9 and helical groove 17 to obtain an even greater length of travel for a 360° revolution of shaft 4. Accuracy can also be improved by increasing the diameters of shaft 4 and sleeve member 5 which has the effect of lengthening helical groove 17. My device accuracy is also a function of the accuracy with which the helical groove 17 of constant pitch can be formed on the sleeve member.

The helical groove 17 as depicted in FIG. 1 is formed completely through the side of sleeve member 5. Alternatively, as depicted in the sectional view of FIG. 3, which would be taken along line 3—3 in FIG. 1, the helical groove 17' is formed in the inner surface of sleeve member 5 and does not pass completely through the side thereof as in the case of FIG. 1. Suitable venting to the atmosphere is provided by one or preferably more than one vent hole 30 passing radially outward of the helical groove to the outer surface of sleeve member 5. This alternative form of the helical groove may also be utilized in the FIG. 2 embodiment to be described hereinafter.

Sleeve member 5 has been described hereinabove as being supported in a fixed (nonrotary) position within housing 6 of my device. There are applications, however, wherein relative motion between two rotatable members occurs, and it is desired to sense the relative motion inputs. In such case sleeve member 5 is not retained in a fixed nonrotary position but is adapted for rotary motion by any suitable means such as the depicted gear 18 mounted around a central portion of sleeve member 5 in FIG. 1. In the case wherein the means for rotating sleeve member 5 is a gear, a second gear (not shown) is positioned in meshing engagement with gear 18 and such second gear is suitably driven by an actuator device such as a motor. In this case wherein both shaft 4 and sleeve member 5 are rotated by independent means, the differential pressure $P_{01}-P_{02}$ developed across the output ends of passages 11 and 12 is directly and linearly proportional to the relative motion inputs to shaft 4 and sleeve member 5.

Figure 2:
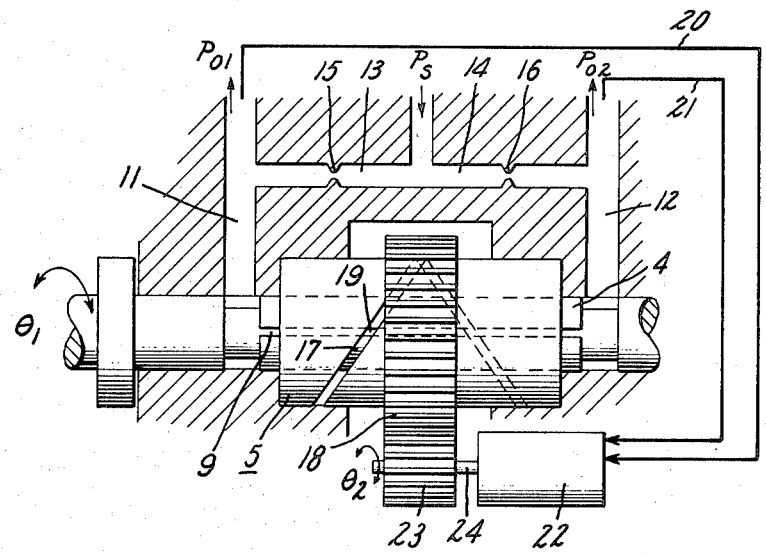
FIG. 2 is a diagrammatic view of my fluidic angular position sensor adapted for null type operation.

There are numerous control systems wherein a null type of operation for a sensor therein is desired. An advantage of the null type operation is that, in the case of the FIG. 2 embodiment, sensor operation is independent of changes in pressure of fluid supply $P_s$. The null type operation is obtained by providing a suitable negative feedback means from the output ends of passages 11 and 12 across which are developed the output differential pressure $P_{01}-P_{02}$, to the input of gear 18 or other suitable means which provide rotary motion of sleeve member 5. In the FIG. 2 embodiment, the negative feedback circuit includes a pair of fluid flow passages 20 and 21 connected from the output ends of passages 11 and 12, respectively, a fluid motor 22 and a gear 23 driven thereby. The output ends of passages 20 and 21 are connected to the input of motor 22 which may be of the hydraulic or pneumatic type depending whether the fluid medium employed in the sensor is hydraulic or pneumatic. The gear 23 driven by motor 22 is in meshed engagement with gear 18 mounted on sleeve member 5. At initial steady state conditions, the vented point of overlap 19 is at midpoint (180° point) of the helical groove, that is, midway along axial groove 9 such that variable restrictors 9a and 9b are equal and thus pressure $P_{01}=P_{02}$. A change in angular displacement of shaft 4, such as by rotation thereof through an angle $\theta_1$ from the reference or zero angle, momentarily results in a particular differential pressure $P_{01}-P_{02}$ developed across the output ends of passages 11 and 12 (due to the vented point of overlap 19 being shifted from the midpoint as illustrated in FIG. 2) which is transmitted to motor 22 and causes the shaft 24 on which gear 23 is mounted to assume the displacement angle $\theta_1$. Angle $\theta_2$ is related to the angle $\theta_1$ of shaft 4 in such a manner as to produce a nulling of the differential output pressure $P_{01}-P_{02}$. This nulling is obtained by the rotation of gear 23 causing rotation of sleeve member 5 (with respect to shaft 4) through gear 18 in a direction to shift the vented point of overlap 19 of axial groove 9 back to the midpoint of helical groove 17 whereby the differential pressure $P_{01}-P_{02}$ approaches zero. In the case of gears 23 and 18 having a gear ratio of unity, the displacement angle $\theta_2$ is equal to the shaft 4 displacement angle $\theta_1$. In the case of the gears having a ratio other than unity, the two shaft angles $\theta_1$, $\theta_2$ are related by the gear step-up or stepdown ratio.

From the foregoing description, it is apparent that my invention attains the objectives set forth and makes available a new fluidic angular position sensor having linear operation over its entire range of operation due to the fact that the axial groove in the rotary shaft is parallel to the shaft axis and the helical groove in the sleeve member is of constant pitch. The helical groove may be formed over an entire 360° of angular rotation whereby the sensor is operable over such total angle of displacement from a reference angle position. Finally since the sensor is operable linearly over its entire range of operation, and the range of motion may be increased, as desired, by lengthening one or both the axial groove and the helical groove, or increasing the diameters of shaft 4 and sleeve member 5, it can be appreciated that accuracy to any desired degree may be attained with my device.

What I claim as new and desire to secure by Letters Patent of the United States is:

1. A linear fluidic bridge circuit comprising
    a rotary shaft having an axial groove in the outer surface thereof,
    means surrounding a portion of said shaft including the axial groove in fluidtight relationship and having a vented helical groove of constant pitch in overlapping fluid communication with the axial groove, said shaft being rotatable relative to said helical groove means,
    first passage means including a pair of fixed fluid flow restrictors therein for forming one-half of the fluidic bridge circuit, first ends of said fixed restrictors connected at a juncture supplied from a source of pressurized fluid, and
    second passage means interconnecting nonjuncture second ends of said fixed restrictors with the two ends of the axial groove on said rotary shaft for forming the second half of the fluidic bridge circuit consisting of a pair of variable fluid flow restrictors formed by the axial groove divided into two variable length parts defined between the ends thereof and the vented point of overlap thereof with the helical groove wherein the point of overlap varies linearly with change in angular position of the rotary shaft.

2. The linear fluidic bridge circuit set forth in claim 1 and further comprising
    a housing for supporting said rotary shaft and helical groove means, said helical groove means being retained within said housing in a fixed position,
    said second passage means having first ends in fluid communication with the two ends of the axial groove and second ends comprising the output of said bridge circuit across which is developed a differential pressure that varies linearly with change in angular displacement of the rotary shaft from a reference angular position whereby said bridge circuit functions as a fluidic angular position sensor.

3. The fluidic bridge circuit set forth in claim 2 wherein
said first passage means having first ends in fluid communication with the juncture supplied from the source of pressurized fluid,
the source of pressurized fluid being maintained at a relatively constant pressure,
said first passage means having second ends in fluid communication with said second passage means intermediate the ends thereof, and
said rotary shaft provided with reduced diameter portions adjacent both sides of the shaft portion including the axial groove, the reduced diameter shaft portions forming angular-shaped chambers for providing fluid communication between the ends of the axial groove and the first ends of said second passage means.

4. The linear fluidic bridge circuit set forth in claim 1 and further comprising
a housing for supporting said rotary shaft and helical groove means, said helical groove means provided with means for rotary motion relative to said rotary shaft,
said second passage means having first ends in fluid communication with the two ends of the axial groove and second ends comprising the output of said bridge circuit across which is developed a differential pressure that varies linearly with change in relative angular displacement between said rotary shaft and said helical groove means whereby said bridge circuit functions as a fluidic relative angular motion transducer.

5. The fluidic relative angular motion transducer set forth in claim 4 and further comprising
negative feedback means connected from the second ends of said second passage means to the means for providing rotary motion of said helical groove means to obtain a null-type operation of said fluidic transducer whereby the differential pressure across the second ends of said second passage means approaches zero.

6. The transducer set forth in claim 5 wherein
means for providing rotary motion of said helical groove means comprises a first gear mounted on the outer surface of said helical groove means,
said negative feedback means comprises
third passage means having first ends connected to the second ends of said second passage means,
a fluid motor, said third passage means having second ends connected to the input of said fluid motor, and
a second gear driven by said fluid motor, said second gear in meshing engagement with said first gear, said second gear being driven to an angular displacement relative to the angular displacement of said rotary shaft to obtain the nulled differential pressure output across the second ends of said second passage means.

7. The transducer set forth in claim 6 wherein
said third passage means comprise a third pair of fluid flow passages.

8. The linear fluidic bridge circuit set forth in claim 1 wherein
said helical groove means comprises a sleeve member concentric with said rotary shaft and surrounding a portion thereof including the major part of the axial groove,
the vented helical groove consisting of a helical groove formed completely through the side of said sleeve member.

9. The fluidic bridge circuit set forth in claim 1 wherein
said helical groove means comprises a sleeve member concentric with said rotary shaft and surrounding a portion thereof including the major part of the axial groove,
the vented helical groove consisting of a helical groove formed into the inner surface of said sleeve member but not passing completely through the side thereof, and vent means provided from the helical groove to the outer surface of said sleeve member,
said axial groove having constant narrow width and depth dimensions to provide a relatively high restriction to fluid flow therethrough,
said helical groove having larger width and, or depth dimensions than the axial groove to provide a negligible restriction to fluid being vented therethrough.

10. The fluidic bridge circuit set forth in claim 1 wherein
said first and second passage means comprise first and second pairs of fluid flow passages, respectively.

* * * * *